(12) United States Patent
Tanaka et al.

(10) Patent No.: US 6,301,028 B1
(45) Date of Patent: Oct. 9, 2001

(54) HOLOGRAPHIC MEMORY AND OPTICAL INFORMATION RECORDING AND REPRODUCING APPARATUS USING THE SAME

(75) Inventors: Satoru Tanaka; Tomomitsu Kouno; Hideki Hatano; Yoshihisa Itoh; Hajime Matsushia; Takashi Yamaji, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/533,763

(22) Filed: Mar. 23, 2000

(30) Foreign Application Priority Data

Mar. 30, 1999 (JP) .................................................. 11-088416

(51) Int. Cl.$^7$ ....................................................... G03H 1/26
(52) U.S. Cl. .............................. 359/22; 359/25; 359/29; 359/30
(58) Field of Search ................................ 359/22, 24, 25, 359/29, 30

(56) References Cited

U.S. PATENT DOCUMENTS

| | | |
|---|---|---|
| 3,751,132 * | 8/1973 | Croh ........................................ 359/24 |
| 4,549,287 | 10/1985 | Hatano et al. . |
| 5,453,969 | 9/1995 | Psaltis et al. . |
| 5,463,609 | 10/1995 | Inagaki et al. . |
| 5,515,348 | 5/1996 | Ohsato . |
| 5,566,261 | 10/1996 | Hall et al. . |
| 5,844,700 * | 12/1998 | Jeganathan et al. .................. 359/22 |

* cited by examiner

*Primary Examiner*—Darren Schuberg
(74) *Attorney, Agent, or Firm*—Fish & Richarson P.C.

(57) ABSTRACT

A description is provided of an optical information recording and reproducing apparatus employing a holographic memory. The apparatus includes a mask disposed in an optical path of the signal light beam so as to cover a light intensity distribution of the signal light beam incident into the holographic memory at nearly a half portion thereof with respect to the center of the distribution of the zeroth-order diffracted light of the signal light beam. The center of a region of the holographic memory where the signal light beam and the reference light beam intersect with each other, is shifted by a distance substantially equal to twice the distance between peaks of the zeroth-order diffracted light or the first-order diffracted light of the signal light beam.

6 Claims, 9 Drawing Sheets

HOLOGRAPHIC MEMORY AND OPTICAL INFORMATION RECORDING AND REPRODUCING APPARATUS USING THE SAME

BACKGROUND OF THE INVENTION

1. Field of the Invention

The present invention relates to a volume holographic memory and an optical information recording and reproducing apparatus using the volume holographic memory.

2. Description of the Related Art

Conventionally, a holographic memory system is known as a digital recording system using the principle of holography. The holographic memory system records digital data on a memory medium made of a photorefractive crystalline such as lithium niobate ($LiNbO_3$) or the like, and reproduces the data from the same. The photorefractive effect is a phenomenon in such that electric charges generated by photo-excitation move within a crystal thereby to form a spatial electric field distribution, which combines with a primary electro-optical effect i.e., Pockels effect to change a refractive index distribution in the crystal. In a ferroelectric crystal or the like exhibiting the photo-refractive effect, its change of the refractive index is responsive even to a fine optical input pattern of 1,000 lines or more per one millimeter, and this effective action is generated at a response speed on the order of microseconds to seconds in real time, though the response speed varies depending on kinds of materials. Therefore, a variety of applications for such crystals has been studied as a real time hologram medium which does not require any developing. The holographic memory system is capable of recording and reproducing data on a two-dimensional plane page unit, and also performing a multiple recording with use of a plurality of the page units. The volume holographic memory is designed to enable three-dimensional recording with a crystal medium being of a three-dimensional shape such as a rectangular parallelepiped or the like. In the volume holographic memory, which is one type of Fourier transform holograms, data is recorded at every two-dimensional image page unit in a dispersed manner within a three-dimensional space of the volume holographic memory. In the following, the outline of the holographic memory system will be described with reference to FIG. 1.

Referring to FIG. 1, an encoder 25 translates digital data to be recorded in a volume holographic memory 1 into a dot pattern image consisting of light and dark spots arranged in a plane, and rearranges the image in a data arrangement, for example, a data array of 480 pixels in the vertical direction and 640 pixels in the horizontal direction to generate a unit page sequence data. The unitary page sequence data is supplied to a spatial light modulator (SLM) 12 including a panel of a transmission type Thin Film Transistor (TFT) liquid crystal display (hereinafter also called simply as "LCD").

The spatial light modulator 12 has a modulation unit for performing a modulation processing of 480 pixels in a line and 640 pixels in a row which corresponds to one unit page, and optically modulates a light beam into an on/off signal of spatial light in accordance with the unit page sequence data from the encoder 25, and guides the modulated light beam, i.e., signal light beam to a lens 13. More specifically, the spatial light modulator 12 passes therethrough the light beam in response to a logical value "1" of the unit page sequence data, which is an electric signal, and shuts off the light beam in response to a logical value "0" thereby to accomplish the electro-optical conversion in accordance with the contents of respective bits in the unit page data. Accordingly, the signal light beam including the unit page sequence is generated by modulation of the light beam.

The signal light beam is incident upon the volume holographic memory 1 through the lens 13. In addition to the signal light beam, a reference light beam is incident upon the volume holographic memory 1 at an angle β(hereinafter, referred to as "incident angle β") relative to a predetermined baseline perpendicular to an optical path of the signal light beam.

Both the signal light beam and the reference light beams interfere with each other within the volume holographic memory 1, and the resulting interference fringes are stored as a refractive index grating within the volume holographic memory 1, whereby recording of data is effected. Also, when the volume holographic memory 1 is irradiated multiple times with the reference light beam at different incident angles βto record a plurality of two-dimensional plane data in an angle multiplexing form, a recording of three-dimensional data can be accomplished.

When reproducing the recorded data from the volume holographic memory 1, only the reference light beam is introduced into the volume holographic memory 1 at the same incident angle βas at the time of recording toward the center of a region in which the signal and reference light beams intersect with each other. In other words, the reproducing of the recorded data is different from the recording of the data in that the signal light beam is not introduced into the volume holographic memory 1. Therefore, the volume holographic memory 1 diffracts the reference light beam at the intersection of the refractive index grating caused by interference fringes. The diffracted light from the refractive index grating recorded in the volume holographic memory 1 is guided through a lens 21 to a photodetector such as a Charge Coupled Device (CCD) array 22 on which a light and dark pattern image i.e., an image of the data arrangement is reproduced. The CCD 22 converts the received image into variations in intensity of an electric signal to output to a decoder 26 an analog electric signal having a level corresponding to a distribution of brightness in the incident image. The decoder 26 compares the analog electric signal with a predetermined amplitude i.e., a slice level to reproduce data consisting of the corresponding "1" and "0".

Since the volume holographic memory records two-dimensional plane data sequences as described above, angle multiplexing recording can be performed by changing the incident angle βof the reference light beam. Specifically, a plurality of two-dimensional planes, i.e., the recorded units, can be defined within the volume holographic memory by changing the incident angle βof the reference light beam. Consequently, three-dimensional recording can be carried out. Examples of angle multiplexing recording are described in Japanese Unexamined Patent Publications Kokai Nos. H2-142979 and H10-97174.

OBJECT AND SUMMARY OF THE INVENTION

It is therefore an object of the present invention to provide an optical information recording and reproducing apparatus which is capable of recording interference patterns in a volume holographic memory at a high density and capable of bing miniaturized.

According to the present invention, there is provided an optical information recording/reproducing apparatus for recording data on a holographic memory formed of a photorefractive crystal and reproducing data from the holographic memory, said apparatus comprising:

a support portion for detachably supporting a holographic memory;

a reference light beam supplying portion for supplying a coherent reference light beam of a first wavelength incident on the holographic memory;

a signal light beam supplying portion for supplying a coherent signal light beam of the first wavelength, which is modulated in accordance with image data, incident on the holographic memory, to intersect the signal light beam with the reference light beam in the holographic memory thereby to generate a three-dimensional light interference pattern of the coherent signal light beam and the reference light beam; and a photo-detecting portion for detecting a diffracted light caused from a refractive index grating of the light interference pattern in the holographic memory caused by irradiation of the reference light beam;

a mask portion disposed in a light path of the signal light beam so as to cover the light intensity distribution of the signal light beam incident into the holographic memory substantially at a half portion thereof with respect to the center of the zeroth-order diffracted light distribution of the signal light beam; and a moving portion for shifting the center of a region of the holographic memory in which the signal light beam and the reference light beam intersect with each other, by a distance substantially equal to twice the distance between peaks of the zeroth-order diffracted light or the first-order diffracted light of the signal light beam.

According to one aspect of the present invention, said apparatus further comprises a gate light beam supplying portion for supplying a gate light beam of a second wavelength into the holographic memory, the gate light beam enhancing a photo-sensitivity of the holographic memory for one of activating and deactivating of a refractive index grating in accordance with the presence or absence of said optical interference pattern.

According to another aspect of the present invention, said gate light beam supplying portion includes a super-luminescent diode.

According to a further aspect of the present invention, said gate light beam supplying portion includes a restricting portion for limiting the gate light beam irradiated in the region in which the signal light beam and the reference light beam intersect with each other.

According to a still further aspect of the present invention, the holographic memory includes a cylindrical body made of a uniaxial crystal having an optical crystallographic axis in parallel with an axis of rotational symmetry, and said moving portion further comprises a transferring portion for moving the cylindrical body in a direction of the optical crystallographic axis, and for rotating the cylindrical body about the axis of rotational symmetry.

According to another aspect of the present invention, the holographic memory is a rectangular solid made of a uniaxial crystal having an optical crystallographic axis in parallel with one surface thereof, and said moving portion further comprises a moving portion for moving the reference light beam with respect to the holographic memory.

According to the present invention, there is also provided a holographic memory comprising:

a cylindrical body made of a uniaxial crystal having an optical crystallographic axis in parallel with an axis of rotational symmetry;

a plurality of refractive index gratings corresponding to three-dimensional optical interference patterns caused by interference between a coherent signal light beam of a first wavelength modulated in accordance with image data and a coherent reference light beam, wherein the refractive index gratings are arrayed at a regular interval such that the angular distance between the centers of the refractive index gratings is substantially equal to twice the distance between peaks of the zeroth-order diffracted light or the first-order diffracted light of a light intensity distribution in the signal light beam.

In addition, there is provided a holographic memory according to the present invention comprising:

a rectangular parallelepiped made of a uniaxial crystal having an optical crystallographic axis in parallel with one surface thereof;

a plurality of refractive index gratings corresponding to three-dimensional optical interference patterns caused by interference between a coherent signal light beam of a first wavelength modulated in accordance with image data and a coherent reference light beam, wherein the refractive index gratings are linearly arrayed at a regular interval such that the distance between the centers of the refractive index gratings is substantially equal to twice the distance between peaks of the zeroth-order diffracted light or the first-order diffracted light of a light intensity distribution in he signal light beam.

DETAILED DESCRIPTION OF THE PREFERRED EMBODIMENTS

Preferred embodiments according to the present invention of an optical information recording and reproducing apparatus will hereinafter be described with reference to the accompanying drawings.

Figure 1:
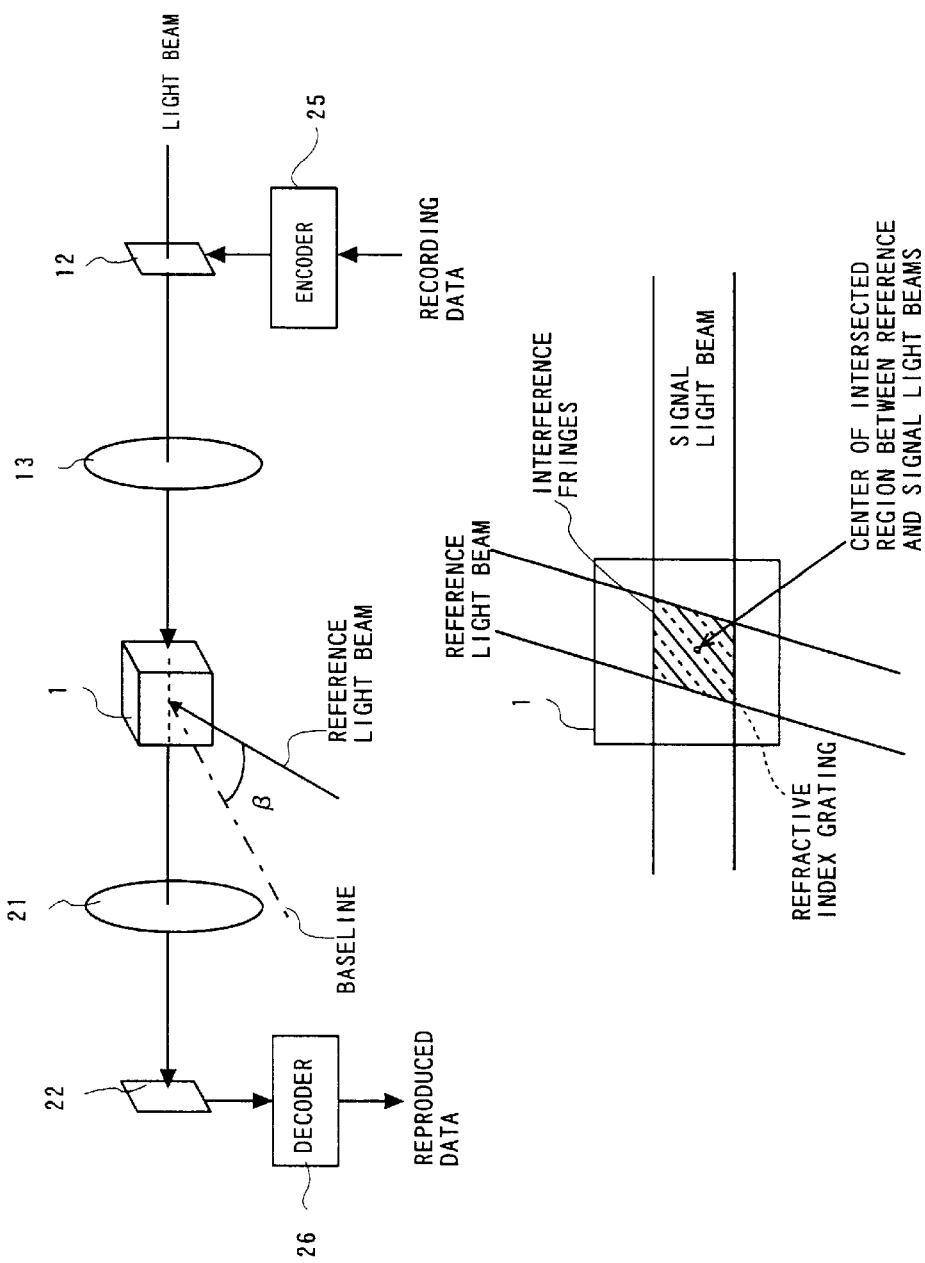
FIG. 1 is a diagram showing a constitution of a conventional volume holographic memory system.
Figure 2:
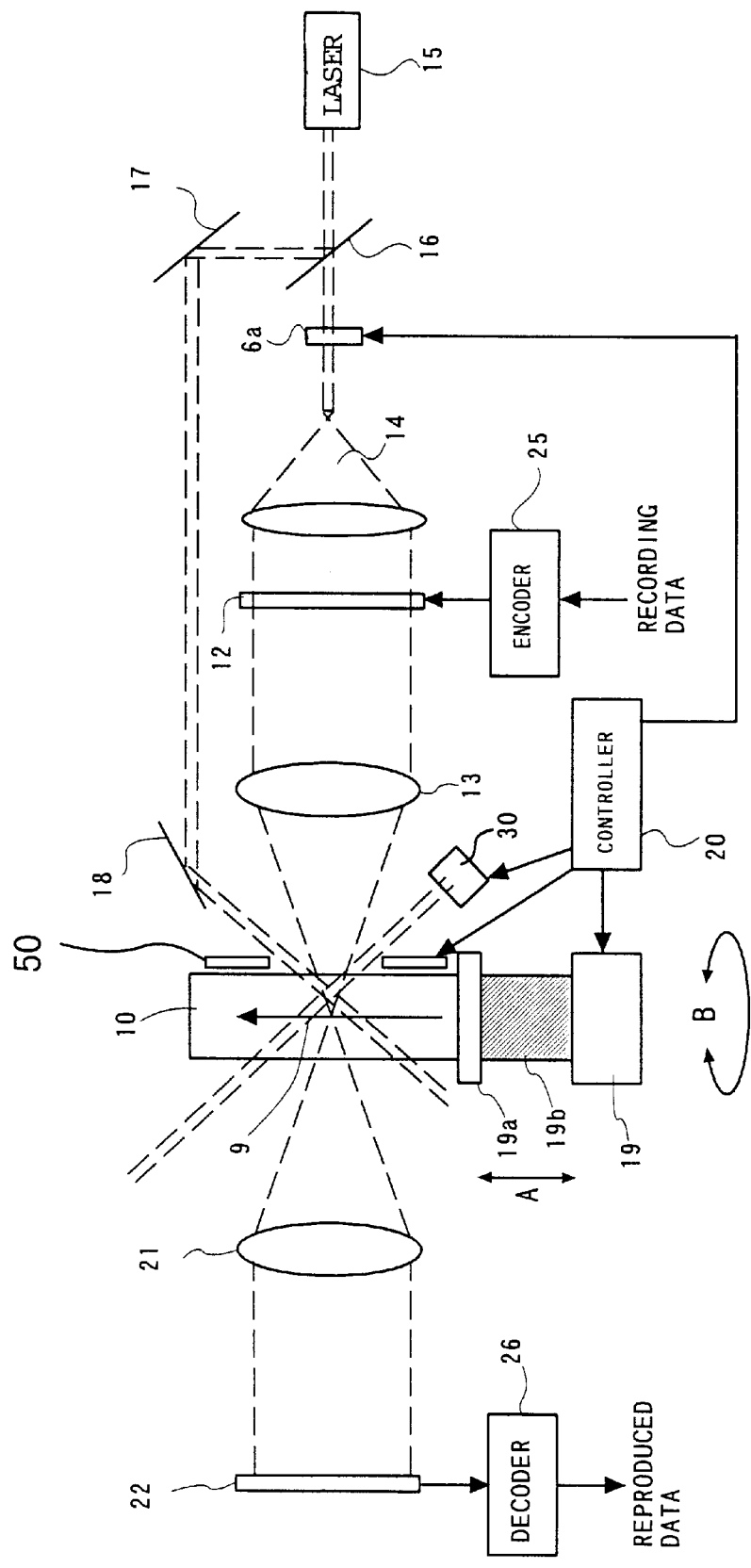
FIG. 2 is a side view showing a constitution of a volume holograph memory system according to the present invention.

FIG. 2 illustrates a side view of an optical information recording and reproducing apparatus as one example.

At the time of recording, a beam splitter 16 split a light beam emitted from a laser 15 into two, i.e., a source light beam which progresses straightly and a reference light beam which is deflected. The resultant light beams are guided to a signal light beam optical system and a reference light beam optical system, respectively.

In the signal light beam optical system, the source light beam having passed through the beam splitter 16 is incident onto a volume holographic memory 10 through a shutter 6a controlled by a controller, a light beam expander 14, a spatial optical modulator 12 and a Fourier transform lens 13. The automatic shutter 6a limits a period of time, during which the source beam irradiates the volume holographic memory. The light beam expander 14 enlarges the source light beam into a parallel light beam having a predetermined diameter. The spatial light modulator 12 converts the source light beam from the beam expander 14 to a signal light beam in accordance with digital recording data supplied from an encoder 25. The spatial light modulator 12 is, for example, a two-dimensional plane LCD having 480 pixels in the vertical direction and 640 pixels in the horizontal direction (480×640). The source light beam is spatially modulated by the spatial optical modulator 12 in accordance with recording page data, for example, through a two-dimensional lattice pattern, such as a diced or checkered like pattern, representing transmittance/non-transmittance of respective pixels, and then the signal light beam is subjected to Fourier transformation by the Fourier transform lens 13. The transformed signal light beam is converged by the lens 13 to pass toward the volume holographic memory 10 and provided into the volume holographic memory 10. In this embodiment, the lens 13 constitutes a Fourier transform system together with a lens 21 below. The volume holographic memory 10 having a cylindrical form is arranged so that a Fourier plane caused by the lens 13 is parallel with a symmetrical axis of rotation of the volume holographic memory 10. The volume holographic memory 10 of a photorefractive crystalline has a cylindrical body made of a uniaxial crystal, such as LiNbO$_3$ or the like, and an axis of the optical crystal is parallel to its rotational symmetry axis.

In the reference light beam optical system, the reference light beam is reflected by a mirror 17 and then by a movable mirror 18 to impinge on the volume holographic memory 10. Inside the volume holographic memory 10, the reference light beam intersects with the signal light beam supplied from the lens 13 to create three-dimensional interference fringes. It should be noted that the optical systems including the mirror 18, the lens 13 and so on are positioned in such a manner that the reference and signal light beams do not interfere just on the Fourier plane but in front of (or behind) the Fourier plane. A controller 20 controls the reflective movable mirror 18 with respect to the position so as to move in a direction parallel to the axis of the signal light beam.

As shown in FIG. 2, a super-luminescent diode 30 is disposed near a lower side portion of the volume holographic memory 10 such that the gate light beam generated from a super-luminescent diode 30 for generating the gate light beam is incident at a predetermined angle onto the side surface of the memory 10. The gate light beam includes a light beam of a second wavelength adapted to increase photosensitivity of the volume holographic memory 10, the second wavelength being different from those of the reference light beam and the signal light beam. The gate light beam activates or deactivates a refractive index grating in accordance with presence or absence of a light interference pattern in the volume holographic memory 10. Accordingly, the gate light beam functions as an erasure light on the refractive index grating which is produced by the light interference pattern. The super-luminescent diode 30, which serves as a gate light beam generating portion, is arranged so as to have the gate light beam restrictedly irradiating a region in which the reference light beam and the signal light beam intersect with each other in the volume holographic memory 10. The super-luminescent diode 30 is on-off controlled by the controller 20.

The volume holographic memory 10 has on the vicinity of the side face thereof a mask 50 disposed in the optical path of the signal light beam. The mask 50 is formed of an LCD or the like and controlled by the controller 20 so that an optical intensity distribution of the signal light beam incident on the volume holographic memory 10 is partly covered, e.g., the mask covers the distribution at nearly the half portion thereof with respect to the center of the zeroth diffracted light.

When data is to be recorded in the volume holographic memory 10, the signal light beam, the reference light beam and the gate light beam are irradiated at a time onto a predetermined region of the volume holographic memory 10, whereby the resultant interference pattern is recorded as a refractive index grating in which refractive index varies depending on the interference pattern. The time duration in which a hologram is formed is controlled by an automatic shutter 6a of a laser light source device.

In the case that a Fourier plane exists within the volume holographic memory, the signal light beam exhibits its maximum intensity on the Fourier plane. Therefore, when the reference light beam interferes with the zeroth light of the signal light beam having a high light intensity on the Fourier plane, the photorefractive effect will saturate, so that there occurs a tendency in that a nonlinear distortion is introduced in a recorded image. The optical systems constituting the apparatus may be positioned such that the reference and signal light beams interfere with each other in front of or behind the Fourier plane to carefully avoid the problem of nonlinear distortion.

The cylindrical volume holographic memory 10 of a cylindrical body is shifted at a predetermined pitch in the direction of an optical crystallographic axis and rotated at a predetermined angular pitch on the axis of rotation. That is, the volume holographic memory 10 is moved by any means, or any mechanism capable of moving the volume holographic memory 10 in the vertical direction and rotating the same. The mechanism capable of moving the volume holographic memory 10 in the vertical direction and rotating the same, includes a driving unit 19 and a vertical moving mechanism 19b coupled to the driving unit 19 and having a turntable 19a. The driving unit 19 is controlled in the rotation and vertical motion of the table 19a by the controller 20.

The volume holographic memory 10 is detachably disposed on the table 19a so that the optical crystallographic axis 9 coincides with the axis of rotation of the driving unit 19. When the driving unit 19 is rotated, the volume holographic memory 10 is shifted in the direction of arrow "A"

in FIG. 2 while the volume holographic memory 10 is rotated in the direction of arrow "B" in FIG. 2. When the volume holographic memory 10 is shifted vertically in the direction of arrow "A", recording positions of the interference fringes created by the reference light beam and the signal light beam are shifted one by one in the direction of arrow "A", whereby spatial multiple recording can be realized. Further, the volume holographic memory 10 is rotated together with the table 19a, so that the face on which the interference patterns are recorded is rotated. Thus, angular multiple recording and spatial multiple recording can be realized.

While this embodiment shows a moving mechanism for simultaneously performing the angle multiplexing recording and the spatial multiplexing recording, it is also possible to use only one of the mechanism for vertical movements of the volume holographic memory 10 along the crystal optical axis (in the direction of the arrow "A") or the mechanism for rotation of the volume holographic memory 10 (in the direction of the arrow "B") to perform only one multiplexing recording.

Also, in place of the vertical movement and rotation mechanism, it is possible to employ a moving mechanism which can be separately controlled to move the volume holographic memory 10 in the direction of the crystal optical axis and to rotate the volume holographic memory 10. For example, a supersonic motor or the like may be used for rotating the volume holographic memory 10, while a separate uniaxial moving stage may be used for moving the volume holographic memory 10 in the direction of the crystal optical axis.

During reproduction, on the other hand, the volume holographic memory 10, which has been recorded in the aforementioned manner, is mounted on the rotation mechanism, as it is during recording. After that, only the reference light beam from the mirror 18 is allowed to impinge on the volume holographic memory 10 by closing the shutter 6a and turning off the super-luminescent diode 30 under the control of the controller 20. Then, diffraction light diffracted from the interference fringes recorded in the volume holographic memory 10 is made incident as a reproduced light beam on the CCD 22 through the inverse Fourier transform lens 21 to form a reproduced image. The CCD 22 has a two-dimensional light receiving surface made up of 480×640 pixels similarly to the spatial light modulator 12. The CCD 22 transduces the reproduced light received thereby to an electric signal which is output to a decoder 26. The decoder 26 compares the input electric signal with a predetermined slice level, and outputs binary digital data.

Figure 3:
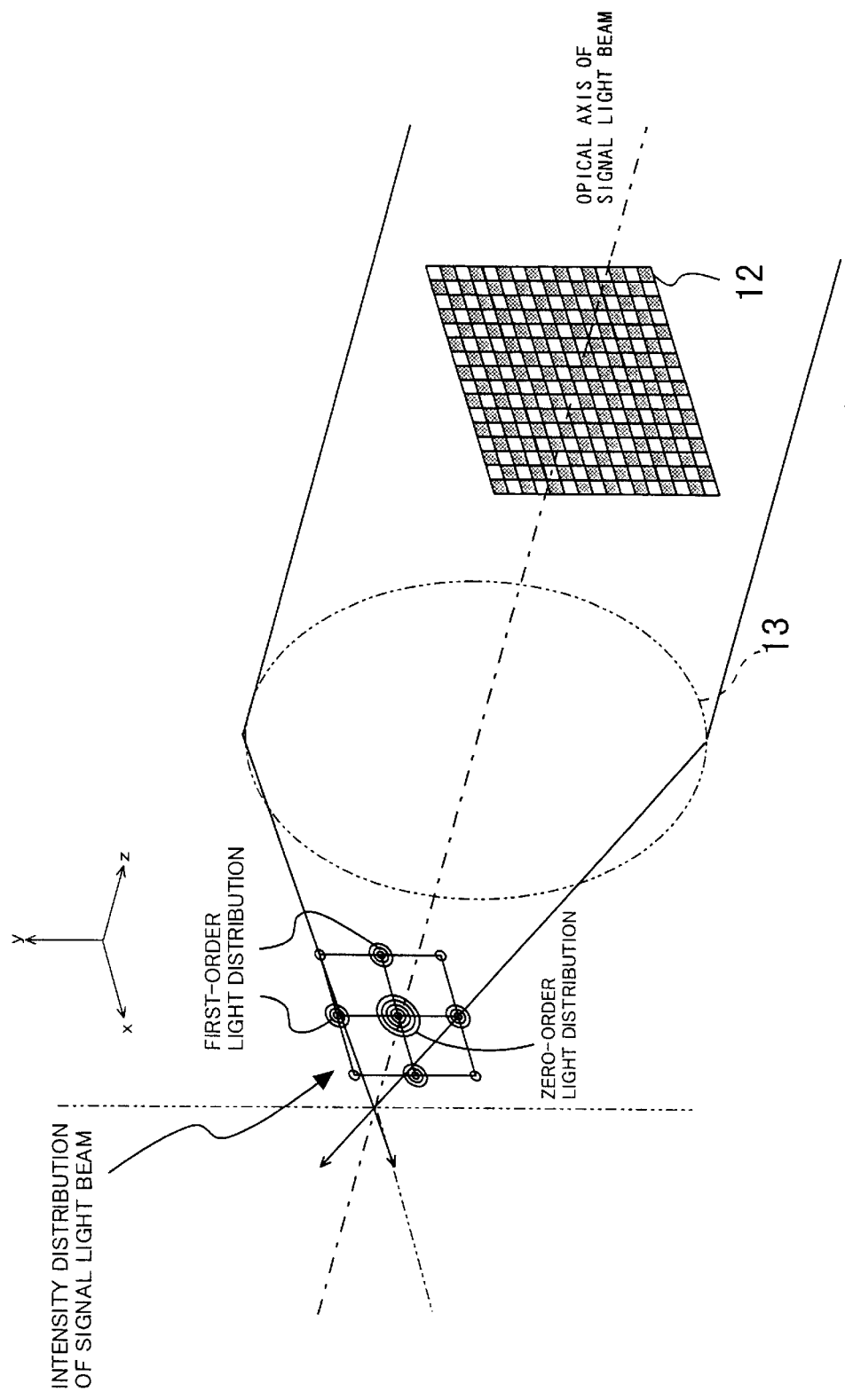
FIG. 3 is a perspective view showing an essential part of the optical information recording and reproducing apparatus according to the present invention and a light intensity distribution of a signal light beam resulting from the apparatus.

When a signal light beam undergoes Fourier transform in the spatial light modulator 12 such as an LCD utilized in a Fourier transform hologram recording, a first-order diffracted light caused from repetitive dot pattern of the spatial light modulator 12 has the highest frequency component. In FIG. 3, if z-axis is set in the optical axis of the signal light beam, y-axis is set in the optical crystallographic axis 9 of the volume holographic memory 10, and x-axis is set in the direction perpendicular to both the axes, when the signal light beam and the reference light beam are brought into interference to effect recording in the volume holographic memory 10, then a spatial frequency spectrum distribution of light intensity is generated on a plane parallel with the Fourier plane so as to be symmetrical with respect to the optical axis of the signal light beam.

Hologram recording has the following advantages. That is, holograms can be stored in a limited space in terms of space utility, information can be subjected to Fourier transform so that it can be recorded in a space resulting from inverse-Fourier transform in a dispersed fashion, and the information can be recorded with high redundancy.

By using the spatial frequency on the recording surface (fsp), the wavelength of light ($\lambda$), the focal distance of the Fourier transform lens 13 (F1), the distance (d) between the zeroth-order Fourier spectrum and the first-order Fourier spectrum on the Fourier plane can be given as follows:

$$d = fsp \cdot \lambda \cdot F1$$

Figure 4:
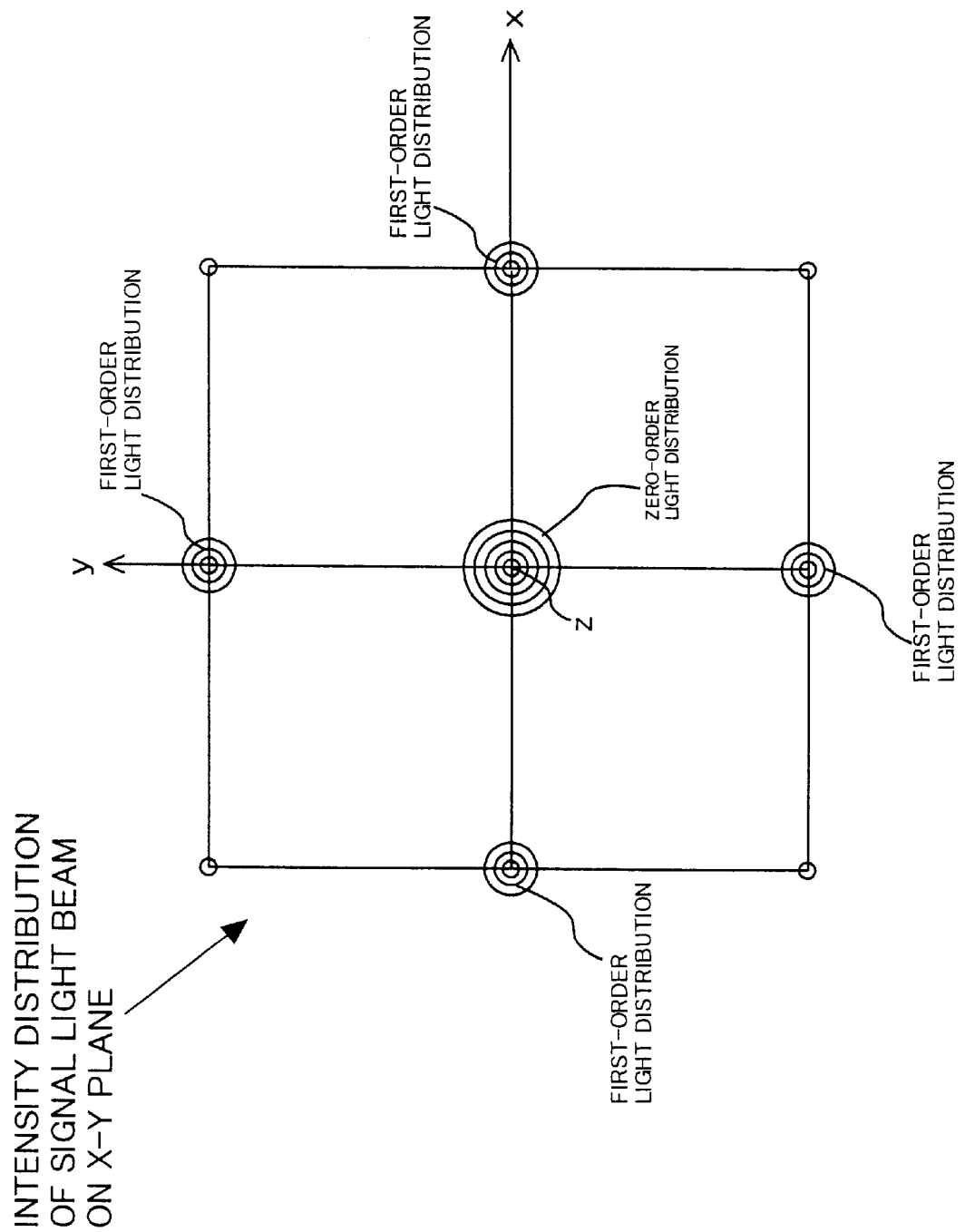
FIG. 4 is a graph showing a light intensity distribution of a signal light beam resulting from the optical information recording and reproducing apparatus according to the present invention.

FIG. 3 shows an intensity distribution of the Fourier transform image of the signal light beam. Since the pixel pitch, wavelength and focal distance of the spatial light modulator 12 are 42 $\mu$m, 532 nm and 165 mm, respectively, the Fourier spectrum distance (d) corresponding to the spatial light modulator 12 becomes 2.1 mm according to the above-introduced equation. Thus, information to be recorded resides in a range of about ±2.1 mm on the optical axis. Accordingly, as shown in FIG. 4, two-dimensional data appearing in the spatial light modulator 12 is dispersed in the x-y space or four quadrisected square in accordance with the intensity distribution of the first-order diffracted light and zeroth-order diffracted light of the signal light beam.

If the spatial light modulator 12 forms the two-dimensional grid pattern consisting of a great number of pixels each indicative of presence or absence corresponding to a status of transparent or not transparent, by means of turning on and off, then the fundamental frequency components of the Fourier transform image of the information becomes a frequency half the repeating frequency component of the pixels.

For this reason, most part of the fundamental frequency components indispensable for recording information are concentrated in the vicinity of the zeroth-order diffracted light spectrum. Thus, information of harmonic component near the first-order diffracted light of pixels are relatively not important.

According to the optical information recording and reproducing apparatus of the present invention, each of the two-dimensional data distributions are arrayed at a regular interval upon recording so that the neighboring first-order diffracted light patterns of the irradiated signal light beam are overlaid on one another. According to the constitution, information can be recorded in a densely packed multiple recording fashion. In this case, the two-dimensional data distributions are arrayed so that the first-order diffracted light intensity distribution and the zeroth-order diffracted light intensity distribution are not overlaid on each other.

Figure 5:
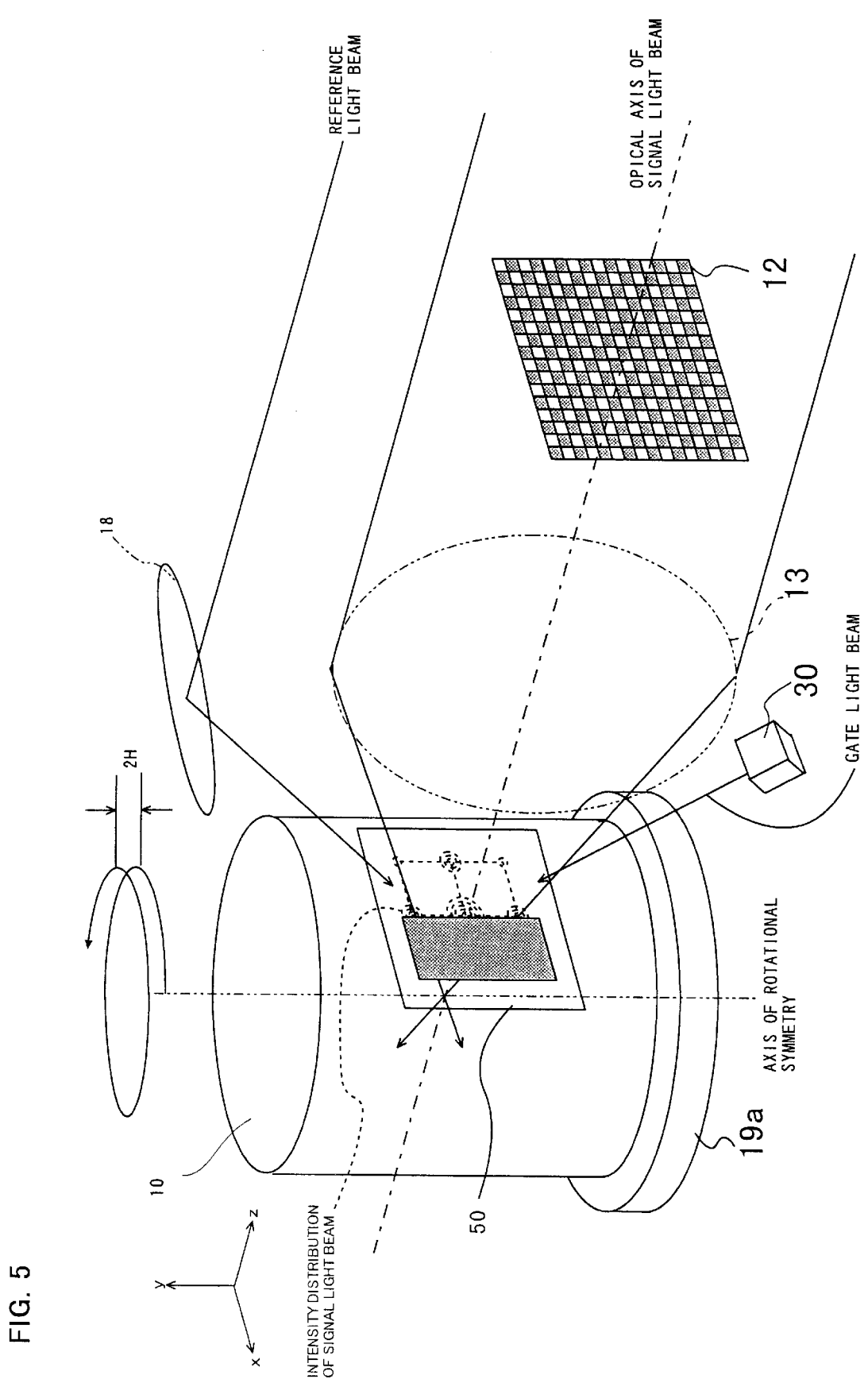
FIG. 5 is a perspective view showing an essential part of an optical information recording and reproducing apparatus having a cylindrical volume holographic memory mounted thereon according to the present invention.

If the volume holographic memory has a cylindrical shape as shown in FIGS. 2 and 5, an image made to contain information by the spatial light modulator 12 is formed on the CCD array 22 as a light detector. Thus, information is recorded and reproduced. However, since light passes through the cylindrical curvature surface of the volume holographic memory, it is necessary for the optical system to be equipped with a correcting optical system for correcting distortion of the image formed thereon.

When the signal light beam passes through the curved surface, narrower the width of the signal light beam in the curved direction of the volume holographic memory, more the incident condition can be approximated to a status that a beam is incident into a plane surface. Which fact makes it easy to design the correcting optical system.

When multiple recording is carried out on the curved surface, information contained in the curved surface, or the lateral direction (x-direction), is covered by a mask 50 so that the recording surface is limited to nearly half the area in the direction. Thus, the correcting optical system can be arranged with ease.

Figure 6:
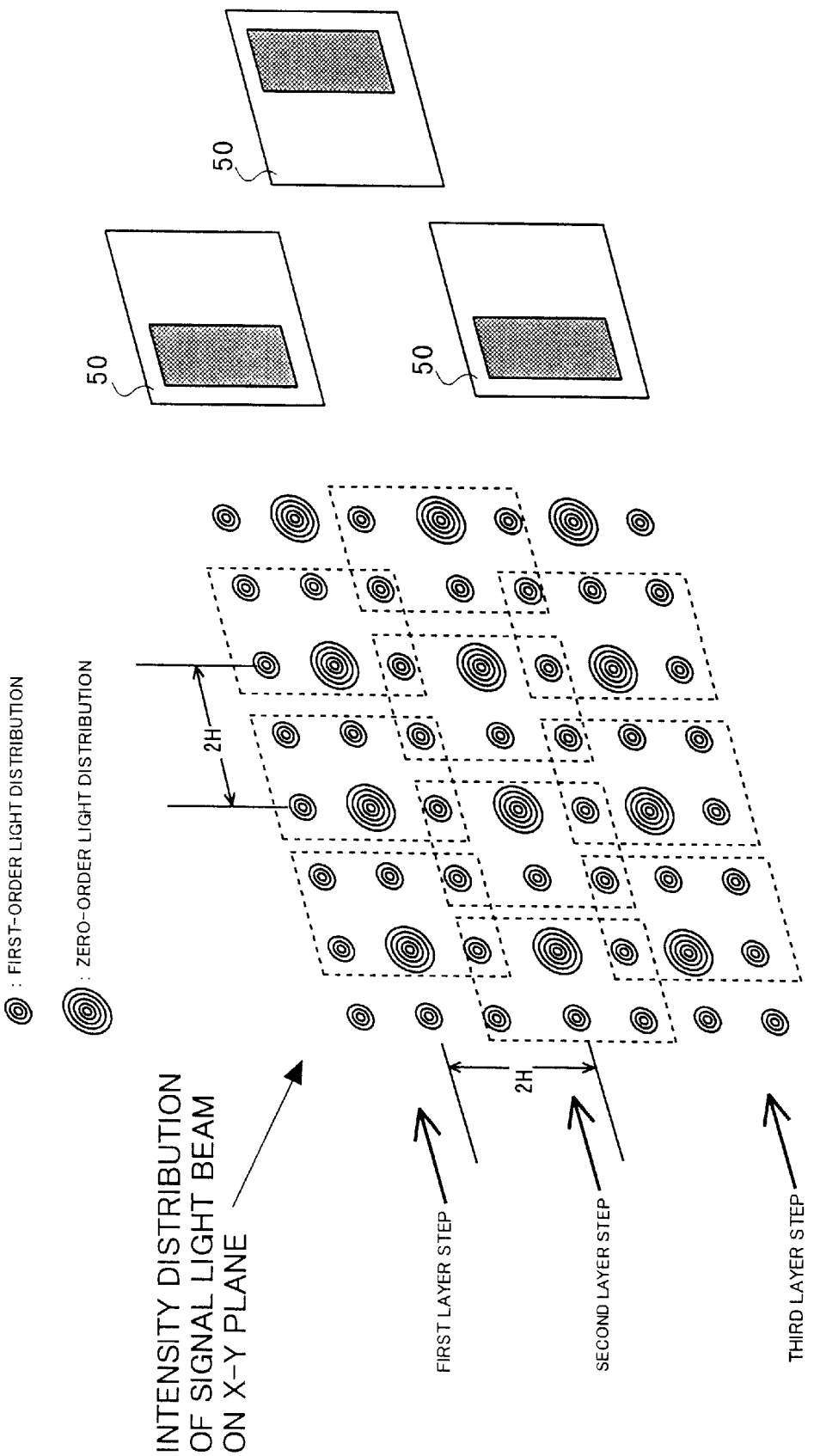
FIG. 6 is a perspective view for explaining, in relation with a light intensity distribution of a signal light beam, how a mask is utilized for recording in order a number of holograms within the cylindrical volume holographic memory.

FIG. 6 shows a specific example of constitution in which when a number of holograms are recorded in the cylindrical volume holographic memory, the holograms are arrayed so that neighboring first-order diffracted light patterns of the signal light beam are overlaid on one another in terms of spatial layout. In the figure, the recording surface of the cylindrical volume holographic memory is developed with respect to the axis of rotation of the volume holographic memory, whereby a light intensity distribution of the signal light beam is shown in a planar fashion. However, respective light intensity distributions are actually arrayed in a rotating fashion on the cylindrical co-ordinates and hence separated from one another. The terms "arrayed in an rotating fashion and hence separated from one another" means that if a cylindrical volume holographic memory having a line at a certain position with respect to the axis of rotation is rotated on the axis of rotation, the line will be positioned at a different angular position relative to the original position in association with the rotation angle of the volume holographic memory.

As shown in FIG. 6, in accordance with the control of the controller 20, when a unit recording operation is carried out to create a first recording layer, the signal light beam is masked at the left half part by the mask 50 so that only the right half part of the signal light beam can pass through the mask 50 (portions surrounded by dot lines). Conversely, when the unit recording operation is carried out to create a second recording layer, the signal light beam is masked in turn at the right half part by the mask 50 so that only the left half part of the signal light beam can pass through the mask 50. At this time, the cylindrical volume holographic memory is shifted in the vertical direction at a predetermined pitch while rotated on the axis of rotation so that the recording surface is moved in a spiral fashion. Thus, multiple recording in terms of angle and multiple recording in terms of space can be effected at a time. In this case, the distance between the first layer and the second layer in the height direction (interval between the zeroth-order diffracted light patterns) becomes at most a pitch of 2H, and hence information can be recorded in the most densely packed multiple fashion. In this way, according to the optical system including the cylindrical volume holographic memory 10, the volume holographic memory comes to contain a plurality of refractive index gratings corresponding to a three-dimensional optical interference pattern caused by interference between the signal light beam, which is modulated in accordance with image data, and the reference light beam. Moreover, according to the optical system including the cylindrical volume holographic memory 10, the center of respective refractive indices is rotationally shifted from one another by an angle corresponding to the distance substantially equal to twice the peak distance between the zeroth-order diffracted light and the first-order diffracted light of a light intensity distribution of the signal light beam.

When the recording operation is carried out to create a third and the following recording layers, the right half part and the left half part of the signal light beam are covered by the mask alternately in the similar manner, whereby an appropriate multiple recording can be carried out. In this case, the interval between the recorded patterns within the same layer becomes at most 2H. However, since the volume holographic memory is arranged as a cylindrical shape, the length in which interference is effected in the recorded portion is sufficiently long. Therefore, if the optical system provides a sufficient angular resolution, the distance between the neighboring recording portions can be made smaller than the pitch of 2H.

While in the foregoing embodiment, the cylindrical volume holographic memory 10 is positioned such that its crystal optical axis is oriented upward, the cylindrical volume holographic memory 10 may be positioned such that the crystal optical axis is oriented downward as long as it is coaxial with the axis of rotation of the rotation mechanism. Also, while the foregoing embodiment has been described for the structure in which the gate light beam generated from the super-luminescent diode 30 is incident on the side surface of the cylindrical volume holographic memory 10, the gate light beam may be incident on the top surface of the volume holographic memory 10.

Figure 7:
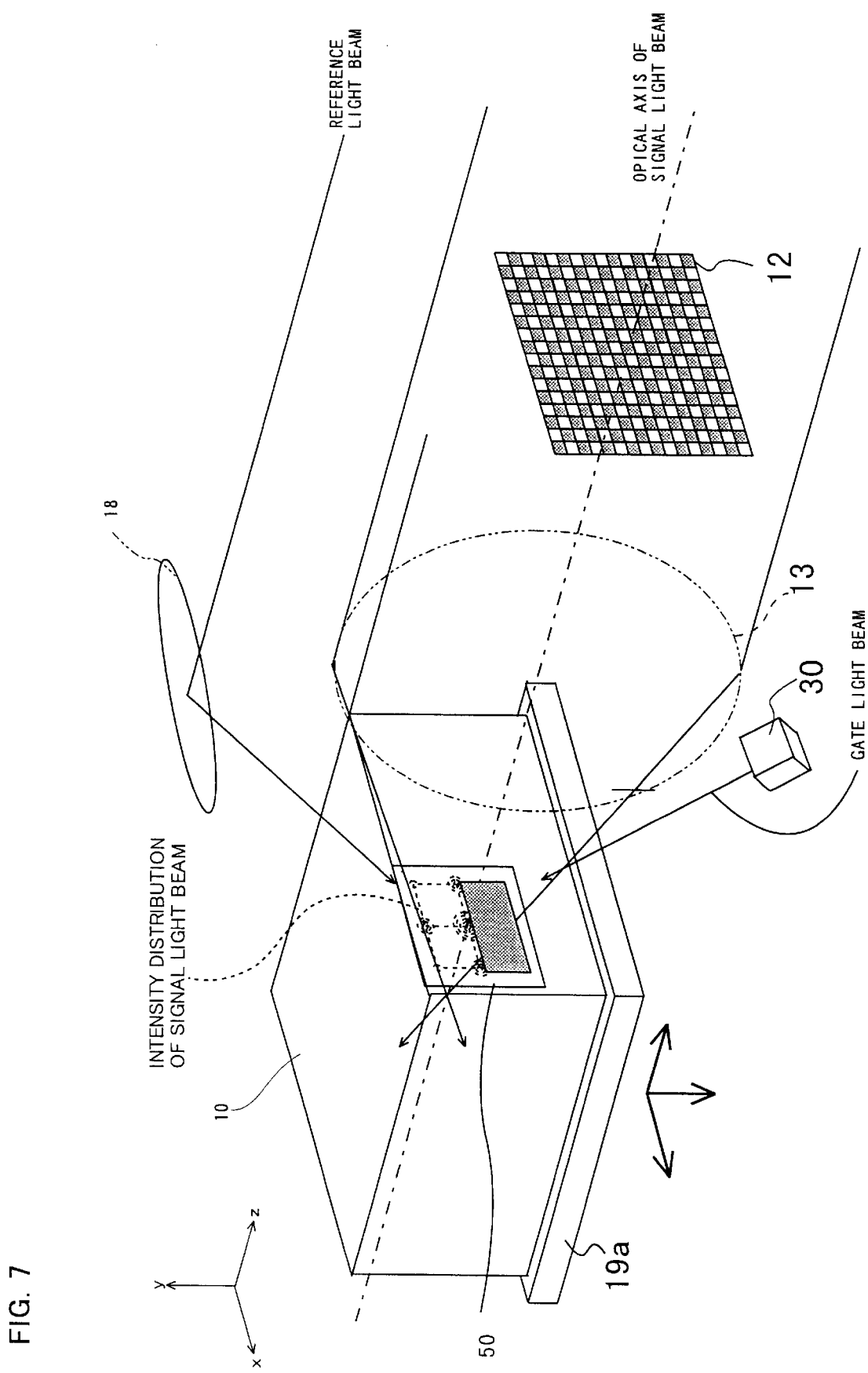
FIG. 7 is a perspective view showing an essential part of the optical information recording and reproducing apparatus of another embodiment having a rectangular parallelepiped volume holographic memory mounted thereon according to the present invention.
Figure 8:
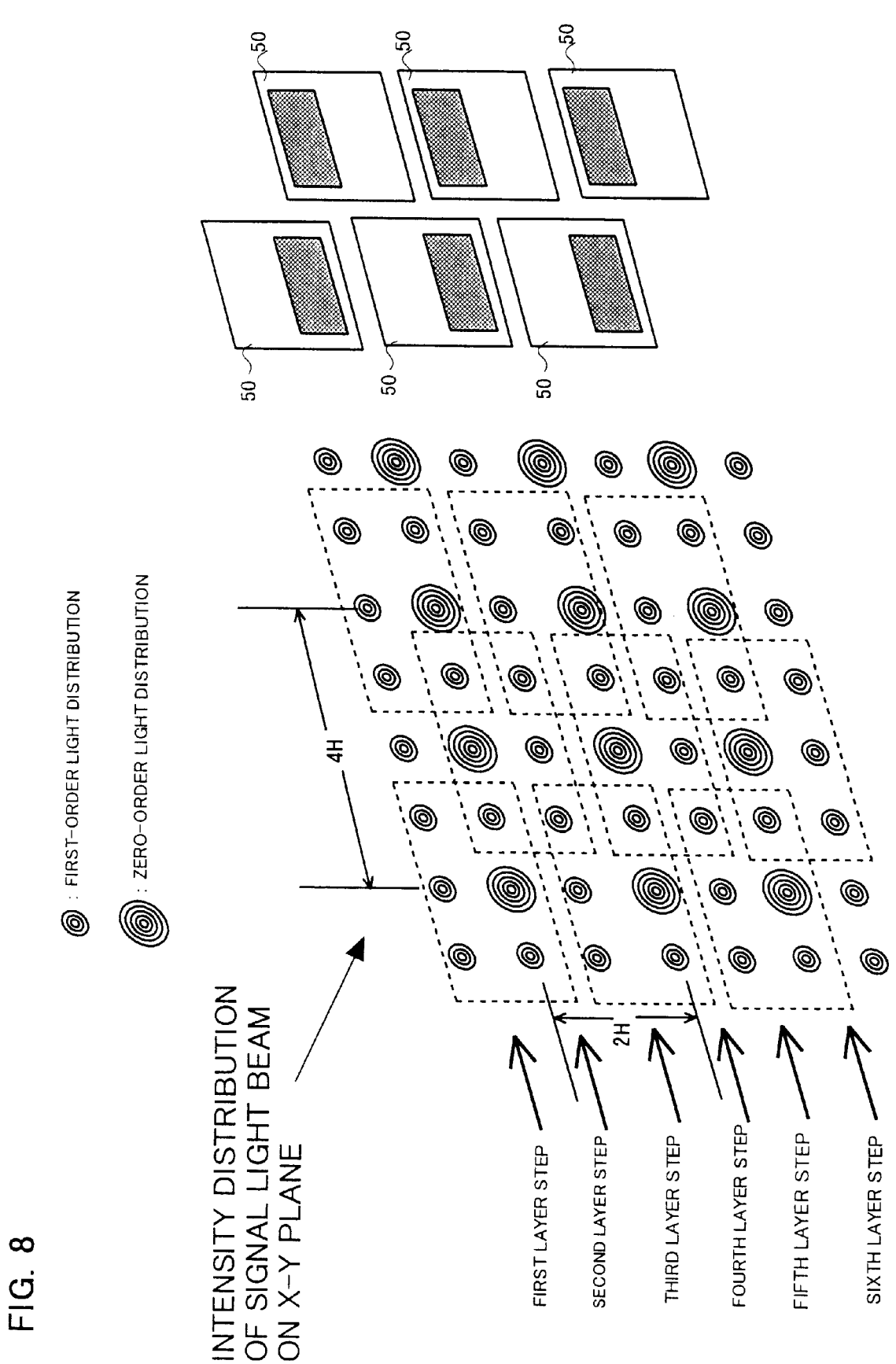
FIG. 8 is a perspective view for explaining, in relation with a light intensity distribution of a signal light beam, how a mask is utilized for recording in order a number of holograms within the rectangular parallelepiped volume holographic memory.

FIG. 7 shows another embodiment in which the volume holographic memory 10 is made into a rectangular parallelepiped and the volume holographic memory 10 is arranged to be independently movable in parallel with the directions of axes of x, y and z. As shown in FIG. 8, when the unit recording operation is carried out to create the first recording layer, the mask 50 is controlled by the controller 20 so that only the upper half part of the signal light beam can pass through the mask 50. Conversely, when the unit recording operation is carried out to create the second recording layer, the mask 50 is controlled so that only the lower half part of the signal light beam in turn can pass through the mask 50. In this case, however, when the unit recording operation is carried out to create the first recording layer and thereafter the same is carried out on the second one, the volume holographic memory 10 need not be moved in the height direction (y-direction) relative to each other. If H is taken as the distance between the zeroth-order diffracted light pattern and the first-order diffracted light pattern, when the recording is carried out in the same height, or by scanning in the horizontal direction (x-direction), the distance between the neighboring recording portions within the same layer is set to a pitch of 4H. Further, recording is carried out on the second layer so that the zeroth-order diffracted light pattern is inserted into the space between the recording portions of the first layer. In this way, recording is carried out in the most densely packed fashion. When the recording operation is carried out to create the third and the following recording layers, the recording layer is shifted in the downward or upward direction by a pitch of 2H with respect to the first or second layer, and the above-described recording operation is repeated. Thus, recording is carried out in the most densely packed fashion. In this way, according to the optical system including the rectangular parallelepiped volume holographic memory 10, the volume holographic memory comes to contain a plurality of refractive index gratings corresponding to a three-dimensional optical interference pattern caused by interference between the signal light beam, which is modulated in accordance with image data, and the reference light beam. Moreover, according to the optical system including the rectangular parallelepiped volume holographic memory 10, the center of respective refractive indexes is directly shifted from one another by the distance substantially equal to twice the peak distance between the zeroth-order diffracted light and the first-order diffracted light of the light intensity distribution of the signal light beam.

Figure 9:
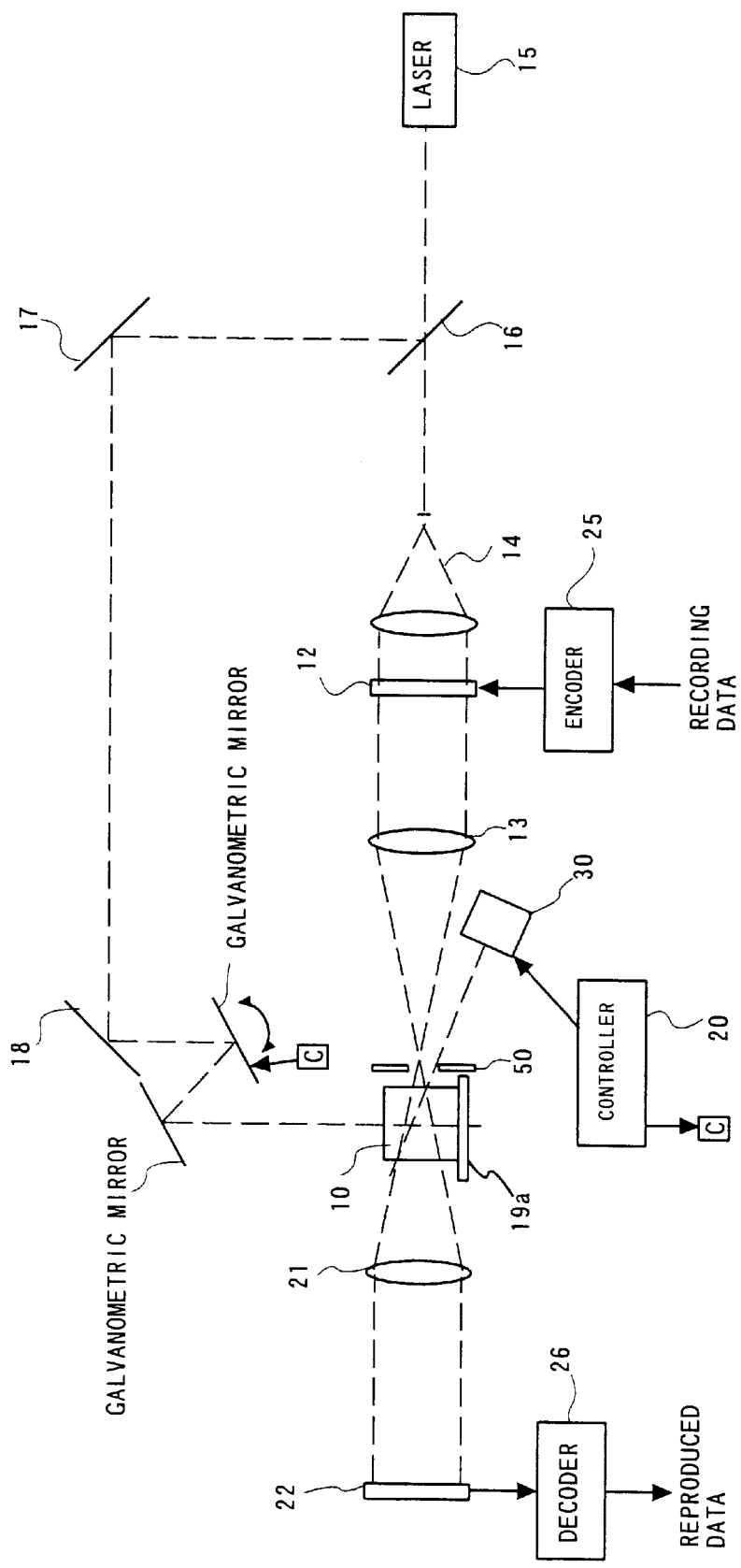
FIG. 9 is a diagram showing a constitution of another volume holographic memory system according to the present invention.

In the above embodiment description has been made on a case where the light beam is made incident on the side face of the volume holographic memory 10, but the constitution of the light beam incident into the volume holographic memory may be modified to construct an angular multiple recording system as for example shown in FIG. 9. That is, the photorefractive crystalline volume holographic memory may be made of a single crystal axis rectangular parallelepiped 10 having an optical crystallographic axis parallel with one plane thereof, a pair of galvanometric mirrors are employed in order for changing the incident angle of the reference light beam with respect to the upper face of the volume holographic memory.

What is claimed is:

1. An optical information recording/reproducing apparatus for recording data on a holographic memory formed of a photorefractive crystal and reproducing data from the holographic memory, said apparatus comprising:

a support portion for detachably supporting a holographic memory;

a reference light beam supplying portion for supplying a coherent reference light beam of a first wavelength incident on the holographic memory;

a signal light beam supplying portion for supplying a coherent signal light beam of the first wavelength, which is modulated in accordance with image data, incident on the holographic memory, to intersect the signal light beam with the reference light beam in the holographic memory thereby to generate a light interference pattern of the coherent signal light beam and the reference light beam; and a photo-detecting portion for detecting a diffracted light caused from a refractive index grating of the light interference pattern in the holographic memory caused by irradiation of the reference light beam;

a mask portion disposed in a light path of the signal light beam so as to cover the light intensity distribution of the signal light beam incident into the holographic memory substantially at a half portion thereof with respect to the center of the zeroth-order diffracted light distribution of the signal light beam; and a moving portion for shifting the center of a region of the holographic memory in which the signal light beam and the reference light beam intersect with each other, by a distance substantially equal to twice the distance between peaks of the zeroth-order diffracted light or the first-order diffracted light of the signal light beam.

2. An apparatus according to claim 1, further comprising a gate light beam supplying portion for supplying a gate light beam of a second wavelength into the holographic memory, the gate light beam enhancing a photo-sensitivity of the holographic memory for one of activating and deactivating of a refractive index grating in accordance with the presence or absence of said optical interference pattern.

3. An apparatus according to claim 2, wherein said gate light beam supplying portion includes a super-luminescent diode.

4. An apparatus according to claim 2, wherein said gate light beam supplying portion includes a restricting portion for limiting the gate light beam irradiated in the region in which the signal light beam and the reference light beam intersect with each other.

5. An apparatus according to claim 1, wherein the holographic memory includes a cylindrical body made of a uniaxial crystal having an optical crystallographic axis in parallel with an axis of rotational symmetry, and said moving portion further comprises a transferring portion for moving the cylindrical body in a direction of the optical crystallographic axis, and for rotating the cylindrical body about the axis of rotational symmetry.

6. An apparatus according to claim 1, wherein the holographic memory is a rectangular solid made of a uniaxial crystal having an optical crystallographic axis in parallel with one surface thereof, and said moving portion further comprises a moving portion for moving the reference light beam with respect to the holographic memory.

* * * * *